United States Patent Office 3,415,784
Patented Dec. 10, 1968

3,415,784
TRIOXANE-TRIOXASPIRO COMPOUND COPOLYMERS AND PROCESS FOR PRODUCTION THEREOF
Yoshizo Tsuda, Masana Yanagi, and Muneyoshi Minami, Ohtsu-shi, Japan, assignors to Toyo Rayon Kabushiki Kaisha, Tokyo, Japan
No Drawing. Filed Aug. 24, 1964, Ser. No. 391,774
12 Claims. (Cl. 260—67)

ABSTRACT OF THE DISCLOSURE

Novel trioxane-trioxaspiro compound copolymers having high thermal stability and a process for preparing said copolymers.

---

This invention relates to novel trioxane-trioxaspiro compound copolymers having high thermal stability and a process for their production, and more particularly to novel copolymers of trioxane with at least one cyclic-trioxaspiro-orthoester having the following formula:

(I)

(wherein R represents a divalent radical selected from the group consisting of ethylene, alkyl-substituted ethylene and haloalkyl-substituted ethylene and R' represents a divalent radical selected from the group consisting of alkylene having at least 3 and not greater than 12 carbon atoms and halogen-substituted lkylene having at least 3 and not greater than 12 carbon atoms) and a process for their production.

Further, it concerns novel copolymers having an inherent viscosity of 0.4 to 2.0 determined at 60° C. in a solution of p-chlorophenol (2% alpha-pinene) and containing from 0.1 to 15 moles of cyclic-trioxaspiro-orthoester units per 100 moles of trioxane units in them and a process for their production.

Polyoxymethylene having recuring —$CH_2O$— units have been known for many years. They may be prepared by the polymerisation of anhydrous formaldehyde or by the polymerisation of trioxane which is a cyclic trimer of formaldehyde. Trioxane may be polymerised to produce a mouldable polymer of excellent toughness. However, such polymers are liable to undergo decomposition reaction such as the breakage of a main chain at high temperatures.

An object of this invention is to overcome the disadvantages which the polymers of the conventional type have and to provide novel and useful copolymers having high thermal stability. Another object of this invention is to present a process for producing such novel copolymers. Still another object of this invention is to disclose a catalyst for use in such a process which includes catalysts not known previously in the polymerisation of trioxane.

Other objects and advantages of this invention will become more apparent from the following descriptions.

Trioxane-trioxaspiro compound copolymers in accordance with this invention are novel ones. Cyclic-trioxaspiro-orthoester, one of the comonomers, is shown by the Formula I in which R represents a divalent radical selected from the group consisting of ethylene, alkyl-substituted ethylene and haloalkyl-substituted ethylene and R' is a divalent radical selected from the group consisting of alkylene having at least 3 and not greater than 12 carbon atoms and halogen-substituted alkylene having at least 3 and not greater than 12 carbon atoms. In this case, it is a matter of course that the number of alkyl and/or halogen, substituent of ethylene or alkylene, not necessarily be one.

Examples of such spiro compound are compounds such as 1.4.6-trioxaspiro-[4.4]-nonane (abbreviation: TSN),

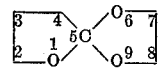

1.4.6-trioxaspiro-[4.5]-decane (abbreviation: TSD),

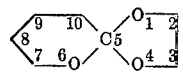

and 1.4.6-trioxaspiro-[4.6]-undecane (abbreviation: TSU) and their derivatives, e.g., 2-methyl-1.4.6-trioxaspiro-[4.4]-nonane
2-butyl-1.4.6-trioxaspiro-[4.5]-decane
2-ethyl-1.4.6-trioxaspiro-[4.6]-undecane
2-octyl-1.4.6-trioxaspiro-[4.4]-nonane
7-methyl-1.4.6-trioxaspiro-[4.4]-nonane
2.3-dimethyl-1.4.6-trioxaspiro-[4.4]-nonane
2.7-dimethyl-1.4.6-trioxaspiro-[4.4]-nonane
2-chloromethyl-1.4.6-trioxaspiro-[4.4]-nonane
8 or 9-chloro-1.4.6-trioxaspiro-[4.4]-nonane
and 10-chloro-1.4.6-trioxaspiro-[4.6]-undecane Especially preferable spiro compounds are 1.4.6-trioxaspiro-[4.4]-nonane (hereinafter often referred to as TSN) and its 2-methyl derivatives.

The novel copolymers of this invention include copolymers having an inherent viscosity of 0.4 to 2.0 determined at 60° C. in a solution of p-chlorophenol (2% alpha-pinene) and containing 0.15 to 15 moles of cyclic-trioxaspiro-orthoester units per 100 moles of trioxane units in them.

The term "inherent viscosity" or "$\eta_{inh}$" as used herein is defined by the following equation:

$$\eta_{inh} = ln\eta_{rel}/C$$

wherein $ln$ represents natural logarithm, C is a concentration of the solute in grams per 100 cc. of solvent, and $\eta_{rel}$ is a relative viscosity of a diluted polymer solution (usually 0.5%).

The novel copolymers of this invention are mouldable copolymers having excellent toughness and high thermal stability, and can be applied to machine parts, filaments, films and other shaped articles.

In accordance with this invention, the said novel copolymers can be produced by reacting trioxane with at least one cyclic-trioxaspiro-orthoester of the said Formula I in the presence of a cationic catalyst.

As the catalyst, there can be employed catalysts usable for the polymerisation of trioxane. Examples of such catalysts are Lewis acids such as $BF_3$, $SbCl_5$, $SnCl_4$, $FeCl_3$, $TiCl_4$ and $PF_5$, complex compounds of these Lewis acids with organic compounds having electron-doner such as O.S.N.P., oxonium fluoborate and carbonium fluoborate.

As the said complex compounds, there can be listed complex compounds of the said Lewis acids with organic compounds such as methyl alcohol, ethyl alcohol, ethyl ether, butyl ether, acetone, methylethyl ketone, acetaldehyde, acetic acid, anhydrous acetic acid, acetic acid ethyl, ethyl mercaptan, dimethylsulfide, thioacetic acid ethyl ester, aniline, naphthylanine, diphenylanine, dimethylaniline, pyridine, phenothiazine, nitrobenzene, nitromethane, triethylphosphine and triphenylphosphine.

Examples of oxonium fluoborates are trimethyl-oxonium fluoborate, triethyl-oxonium fluoborate, tripropyl-oxonium fluoborate, methyl tetramethylene oxonium fluoborate, ethyl tetramethylene oxonium fluoborate, ethyl pentamethylene oxonium fluoborate, dimethylpyrone oxonium fluoborate, coumarin oxonium fluoborate and camphor oxonium fluoborate.

Furthermore, carbonium fluoborates have not been used previously in the polymerisation of trioxane. The typical examples of such carbonium fluoborate are trimethoxy carbonium fluoborate, triethoxy carbonium fluoborate, O-methyl butyrolactonium fluoborate, O-ethyl butyrolactonium fluoborate, O-propyl butyrolactonium fluoborate, O-methyl- or O-ethyl-N-methyl pyrrolidium fluoborate, O-ethyl- butylolactonium fluoborate, and O-ethyl-phthalidum fluoborate. Other examples are oxonium salts such as chloroantimonic acid, chlorostannic acid and chloroferrate.

The catalysts may effectively be used in the form of an activated catalyst obtainable by reaction with a cyclic ether such as ethylene oxide, dioxolan dioxepane and trioxaspiro compound, etc.

The amount of catalyst to be used is usually 0.0001 to 5 mole percent, preferably 0.001 to 1 mole percent.

Among these catalysts listed above, those preferable are $BF_3$, complex of $BF_3$, with an organic compound having oxygen as an electron-doner, oxonium fluoborate and carbonium fluoborate.

In the use of these catalysts, there may be used conjointly such catalyst activators as anhydrous acetic acid, acetyl chloride, t-butylchloride, diphenyl-methyl chloride, triphenyl-methyl chloride and various fluorides such as ethyl fluoride, butyl fluoride, ethylene fluoride, ethylidene fluoride, benzal fluoride, benztrifluoride.

Polymerisation of trioxane is usually carried out in the presence of an appropriate solvent, but may be effected under a state of fusion in the absence of a solvent.

When it is carried out in the presence of a solvent, there is used a solvent good or poor to trioxane. It may be carried out either in a molten state or in a suspended state. Examples of such solvents are solvents such as hexane, heptane and octane, cyclohexane, methylene dichloride, ethylene dichloride and nitrobenzene and a mixture solution of these. In particular, the conjoint use of the catalyst with nitrated hydrocarbons gives pleasing results to the copolymerisation recation of this invention. As such nitrated hydrocarbons, there may be generally used aromatic nitrobenzene, its alkoxy(methoxy, ethoxy, etc.) alkyl (methyl, ethyl, etc.), chloro, etc. o,m,p-substituted compounds and aliphatic nitroalkane.

The amount of the solvent to be used is not particularly limited, but advantageously employed usually is 0.1 to 10 times by weight.

The catalyst may directly be added to the reaction system, but may be dissolved or dispersed in an appropriate solvent beforehand. In this instance, there may be utilized the same kind of solvent as the said reaction solvents.

The reaction temperature may sufficiently be one at which the reaction system is maintained in a liquid phase (inclusive of suspended state) when a reaction solvent is used, and one at which the molten state is maintained when the reaction is carried out in a molten state.

Usually used is the temperature in the range of about 10° to 200° C. For instance, when a solvent is used, a temperature ranging from about 10° C. which is sufficient enough to maintain the reaction system in a liquid phase to about 120° C. which is near the boiling point of trioxane can be advantageously employed. When polymerisation is carried out under a state of molten reaction system, a temperature in the range of about 60° to 115° C. can be advantageously utilized. As the reaction may be effected under pressure, a temperature above 220° C., for instance, can also be employed, but a temperature ranging from 180° to 220° C. is preferred.

The molar ratio of the material component can be varied in many ways, but a preferable molar ratio is 0.1 to 50 moles of cyclictrioxaspiro-orthoester against 100 moles of trioxane.

Copolymers obtained in accordance with this invention were heated at 220° C. under vacuum for one hour and two hours to measure the degree of degradation which is employed as an index showing their thermal stability. As these copolymers contain a small quantity of thermally unstable part, it decomposes at an early stage of pyrolysis under vacuum. Most of the remaining polymer is thermally stable and hardly decomposes under this condition. This can be substantiated by the smallness of difference between decomposition degrees for one hour and two hour heating. On the other hand, a homopolymer of trioxane is mostly unstable to heat, and the decomposition degree for one hour's heating is as high as more than 50%.

This invention is explained hereinafter by examples.

Example 1

A quantity of commercial trioxane was purified by recrystallizing from a solution of trioxane in methylene chloride which had been dried previously over phosphorous pentoxide and distilled.

50 grams of purified n-heptane, the water content of which was less than 0.005%, and 50 grams of this purified trioxane were mixed and kept at 75° C. in a reaction vessel equipped with an efficient stirrer. 0.5 gram of 1.4.6-trioxaspiro-(4.4)-nonane (TSN) was added to this solution, followed by further addition as a catalyst of 0.5 ml. of a solution prepared by dissolving 3 grams of triethyloxonium fluoborate in nitrobenzene and diluting to 100 ml. The polymer formation began in eleven minutes after the addition of catalyst. At that time, another 1 gram of TSN was added to the solution, and the reaction vessel was kept at 75° C. for two hours. The polymer was then precipitated and isolated. 24 grams of polymer were obtained. The polymer was washed with acetone and dried. This polymer had an inherent viscosity of 1.08. It was confirmed by the presence of absorption at 1740 cm.$^{-1}$, characteristic of the ester group arising from TSN, in the infrared spectrum of the polymer that this was a copolymer of trioxane with TSN. The melting point of this polymer was 168° C.

When a portion of this polymer was heated at 220° C. in vacuum, 18.1% of its weight was lost in one hour by thermal degradation, but the remaining part was in essence thermally stable, losing only 0.5% of its weight in the following one hour.

On the contrary, a homopolymer of trioxane prepared by the same procedure without using the comonomer, TSN, lost 74% of its weight when it was kept at 220° C. in vacuum for an hour.

Example 2

Example 1 was repeated varying the reaction temperature to 70° C. and the solvent to cyclohexane, the water content of which was 0.003%. 1.5 grams of TSN were added as a comonomer of trioxane in the same way as in Example 1. 26 grams of polymer were obtained. This polymer had an inherent viscosity of 0.98 and a melting point of 170° C. The thermal degradation at 220° C. in an hour in vacuum was 18.0%, the further degradation for the following one hour being 0.6%.

Example 3

Example 1 was repeated varying the quantity of comonomer TSN. 0.5 gram of TSN was added beforehand, and 1 gram of TSN was added to the solution when the polymerisation started. Every 15 minutes after the initiation of polymerisation each 1 gram of TSN was added twice. 40 grams of polymer were obtained. This polymer had an inherent viscosity of 1.23. The thermal degradation for one hour at 220° C. in vacuum was 13.0%, the further degradation for the following one hour being only 0.3%.

Example 4

Example 1 was repeated varying the comonomer to 2-methyl-1.4.6-trioxaspiro-(4.4)-nonane (MTSN). 1.5 grams of MTSN were added in the same way as in Example 1. 14 grams of polymer were obtained. The polymer had an inherent viscosity of 1.10. The thermal degradation at 220° C. for an hour in vacuum was 20.0%, the further degradation for the following one hour being only 0.6%.

Example 5

Example 1 was repeated, using O-ethyl-γ-butylolactonium fluoborate as a catalyst for polymerisation.

65 grams of purified trioxane was dissolved in 35 grams of purified n-heptane and kept at 75° C. as in Example 1. 0.33 gram of TSN was added to the solution and then 2.0 ml. of a catalyst solution prepared by dissolving 1 gram of O-ethyl-γ-butylolactonium fluoborate in nitrobenzene and diluting to 100 ml. were added. 1.0 gram of TSN was added one minute after the time when the precipitation of polymer was observed. Polymerisation was continued for 30 minutes at this temperature and then polymer particles were isolated. 33 grams of polymer were obtained. This polymer had an inherent viscosity of 0.91, having an intense absorption band at 1740 cm.$^{-1}$ in its infrared spectrum.

The thermal degradation at 220° C. in an hour in vacuum was 16.5%, the further degradation for the following one hour being 1.0%.

Example 6

Example 1 was repeated, varying the solvent to nitrobenzene.

30 grams of trioxane were dissolved in 70 grams of purified nitrobenzene and kept at 70° C. 0.5 gram of TSN was added and then 1.5 ml. of a solution, prepared by dissolving one gram of triethyloxonium fluoborate in nitrobenzene and diluting to 100 ml., were added. Another one gram of TSN was added when the precipitation of polymer was observed. Polymerisation was continued for 30 minutes. 16.2 grams of polymer were obtained. The polymer had an inherent viscosity of 0.85. The polymer was dissolved in γ-butyrolactone in an atmosphere of nitrogen at 170° C. and then precipitated by cooling, and washed with acetone. The thermal degradation of this precipitated polymer at 220° C. in an hour in vacuum was 2.8%, the further degradation for the following one hour being 0.6%.

Example 7

Example 1 was repeated, using dichloroethane as a solvent. 70 grams of trioxane were dissolved in 30 grams of purified dichloroethane at 50° C. and the polymerisation was performed in the same way as in Example 1. 51.8 grams of polymer were obtained. The inherent viscosity of this polymer was 0.61, the thermal degradation at 220° C. in vacuum in an hour being 4.9%, that of the following one hour being 0.2%.

Example 8

Example 1 was repeated, using 2-chloromethyl-1.4.6-trioxa-[4.4]-spirononane (CTSN) as the comonomer of trioxane.

50 grams of trioxane were dissolved in 50 grams of n-heptane at 75° C., and one gram of CTSN was added. 1.5 ml. of a solution, prepared by dissolving one gram of triethyl-oxonium fluoborate in nitrobenzene and diluting to 100 ml., were added and the polymerisation was continued for 60 minutes at 75° C. 35 grams of polymer were obtained, the inherent viscosity of which was 0.78. From the elemental analysis of chlorine, the amount of CTSN unit contained in the copolymer was found to be 2.2 mole percent. The thermal degradation at 220° C. in an hour in vacuum was 42%, that of the following one hour being very small.

Example 9

Example 1 was repeated, using 2-butyl-TSD, 2-octyl-TSN, 2-ethyl-TSU, 7-methyl-TSN or 9-chloro-TSN as comonomer. The results obtained are as follows.

| Comonomer | Polymer yield (percent) | $\eta_{inh}$ | D1a (percent) | D1-2b (percent) |
|---|---|---|---|---|
| 2-butyl-TSD | 27 | 0.81 | 27 | 1.7 |
| 2-octyl-TSN | 32 | 0.80 | 28 | 1.5 |
| 2-ethyl-TSU | 21 | 0.72 | 39 | 1.8 |
| 7-methyl-TSN | 43 | 0.73 | 36 | 2.3 |
| 9-chloro-TSN | 38 | 0.64 | 46 | 3.5 | a Thermal degradation of the copolymer, at 220° C. in vacuum for an hour expressed in terms of percent.
b Further degradation for the following one hour expressed in terms of percent.

Inherent viscosity $\eta_{inh}$ was measured at 60° C. in 0.5% para-chlorophenol solution containing 2% of alpha-pinene.

Example 10

Example 1 was repeated, using cyclohexane as a solvent. 70 grams of trioxane were dissolved in 30 grams of cyclohexane at 60° C. and the polymerisation was performed at 60° C. in the same way as in Example 1, where 0.8 ml. of the catalyst solution was added and 0.35 gram of TSN was added before the addition of catalyst solution and 0.70 gram of TSN was added when the precipitation of polymer was observed. Polymerisation was continued for 60 minutes and then polymer precipitates were isolated. 31.5 grams of polymer were obtained. This polymer had an inherent viscosity of 1.23. The thermal degradation at 220° C. in vacuum in an hour was 12.3%, the further degradation for the following one hour being 0.2%.

Example 11

Example 10 was repeated, using n-heptane as a solvent. 70 grams of trioxane and 30 grams of n-heptane were mixed and heated to 60° C., where the mixture separated in two liquid phases, one of which contained much trioxane, the other much n-heptane. With an efficient stirring, the polymerisation was performed at 60° C. in the same way as in Example 10, where 0.5 ml. of the catalyst solution were added. Polymerisation was continued for 60 minutes and the polymer particles were isolated. 51.5 grams of polymer were obtained. This polymer had an inherent viscosity of 1.29. The thermal degradation at 220° C. in vacuum in an hour was 15.0%, the further degradation for the following one hour being 0.6%.

Example 12

Example 11 was repeated, using a mixture of 1 part of cyclohexane and 3 parts of n-heptane as a solvent. 75 grams of trioxane and 25 grams of the solvent were mixed and heated to 60° C., where the phase separation was also observed. Polymerisation was performed for 60 minutes in the same way just as in Example 11. 43.3 grams of polymer were obtained. This polymer had an inherent viscosity of 1.39. The thermal degradation at 220° C. in vacuum in an hour was 14.6%, the further degradation for the following one hour being 0.3%.

Example 13

Example 10 was repeated, using BF$_3$-etherate as a catalyst. 65 grams of trioxane was dissolved in 35 grams of cyclohexane at 60° C. Polymerisation was performed at 60° C. in the same way just as in Example 10. 32.3 grams of polymer were obtained. This polymer had an inherent viscosity of 1.1. The thermal degradation at 220° C. in vacuum in an hour was 9.1%, the further degradation for the following one hour being 0.2%.

Example 14

100 grams of trioxane was melted at 65° C., and then 0.5 gram of TSN and a 5% solution of 0.02 gram triethyl-oxonium borofluoride in nitrobenzene were mixed with each other. When the precipitation of polymer was observed, another 1 gram of TSN was added. The polymerisation was thus continued for 5 minutes. The formed solid cake was crushed, thoroughly washed with acetone in Soxhlet's extractor and dried in vacuum. The yield of the copolymer was 63 grams. This copolymer had an inherent viscosity of 1.07. The thermal degradation at 220° C. in vacuum in an hour was 27.7%, further degradation for the following one hour being 2.0%.

Example 15

Example 1 was repeated, using triethoxycarbonium fluoborate as a catalyst of polymerisation. 70 grams of purified trioxane were dissolved in 30 grams of purified heptane and polymerisation was performed in the same way as in Example 11. 0.4 ml. of catalyst solution was added to the solution and then 0.35 gram of TSN was added one minute after the time when the precipitation of polymer was observed. Polymerisation was continued at 60° C. for 60 minutes. 46.3 grams of polymer were obtained. This polymer had an inherent viscosity of 1.2. The thermal degradation at 220° C. in vacuum in an hour was 13.7%, the further degradation for the following one hour being 0.9%.

What we claim is:

1. Copolymers of trioxane with at least one cyclic-trioxaspiro-orthoester of the following formula:

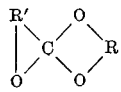

in which R represents a divalent radical selected from the group consisting of ethylene, alkyl-substituted ethylene and haloalkyl-substituted ethylene and R' represents a divalent radical selected from the group consisting of alkylene having at least 3 and not greater than 12 carbon atoms and halogen-substituted alkylene having at least 3 and not greater than 12 carbon atoms wherein the said copolymers have an inherent viscosity of 0.4 to 2.0 determined at 60° C. in a solution of p-chlorophenol (2% alpha-pinene) and contain from 0.1 to 15 moles of cyclic-trioxaspiro-orthoester units present and wherein the final structure of said copolymer consists essentially of

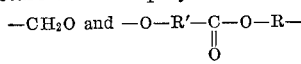

units.

2. Copolymers in accordance with claim 1 wherein the said cyclic-trioxaspiro-orthoester is 1.4.6-trioxaspiro-[4.4]-nonane.

3. Copolymers in accordance with claim 1 wherein the said cyclic-trioxaspiro-orthoester is 2-methyl-1.4.6-trioxaspiro [4.4]-nonane.

4. Copolymers in accordance with claim 1 wherein the said cyclic-trioxaspiro-orthoester is at least one trioxaspiro-compound selected from the group consisting of 1.4.6-trioxaspiro-[4.5]-decane, 1.4.6-trioxaspiro-[4.6]-undecane, 2-butyl-1.4.6-trioxaspiro-[4.5]-decane, 2-ethyl-1.4.6-trioxaspiro-[4.6]-undecane, 2-octyl-1.4.6-trioxaspiro-[4.4]-nonane, 7-methyl-1.4.6-trioxaspiro-[4.4] - nonane, 2.3-dimethyl-1.4.6-trioxaspiro-[4.4]-nonane, 2.7-dimethyl-1.4.6-trioxaspiro-[4.4]-nonane, 2-chloromethyl-1.4.6-trioxaspiro-[4.4]-nonane, 8 or 9-chloro-1.4.6-trioxaspiro-[4.4]-nonane and 10-chloro-1.4.6-trioxaspiro-[4.6]-undecane.

5. A process for preparing copolymers which comprises reacting trioxane with at least one cyclic-trioxaspiro-orthoester of the following formula:

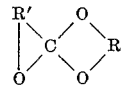

(in which R represents a divalent radical selected from the group consisting of ethylene, alkyl-substituted ethylene and haloalkyl-substituted ethylene and R' represents a divalent radical selected from the group consisting of alkylene having at least 3 and not greater than 12 carbon atoms and halogen-substituted alkylene having at least 3 and not greater than 12 carbon atoms) in the presence of a cationic catalyst, the molar ratio of trioxane to cyclic-trioxaspiro-orthoester in the reaction being 100 moles:0.1 to 15 moles.

6. A process in accordance with claim 5 wherein the said catalyst is present in the amount of 0.0001 to 5 mole percent, preferably 0.001 to 1 mole percent, against trioxane.

7. A process in accordance with claim 5 wherein the said reaction is carried out at a temperature in the range of about 10° to 200° C.

8. A process in accordance with claim 5 wherein the said catalyst is at least one compound selected from the group consisting of $BF_3$, complex of $BF_3$ with an organic compound having oxygen as an electrondoner oxonium fluoborate and carbonium fluoborate.

9. A process in accordance with claim 8 wherein the said complex is at least one complex of Lewis acids with an organic compound selected from the group consisting of methyl alcohol, ethyl alcohol, ethyl ether, butyl ether, acetone, methylethyl ketone, acetaldehyde, acetic acid, anhydrous acetic acid ethyl, ethyl mercaptan, dimethylsulfide, thioacetic acid ethylester, aniline, naphthylamine, diphenylamine, dimethylaniline, pyridine, phenothiazine, nitrobenzene, nitromethane, triethylphosphine and triphenylphosphine.

10. A process in accordance with claim 8 wherein the said oxonium fluoborate is a compound selected from the group consisting of trimethyloxonium fluoborate, triethyl-oxonium fluoborate, tripropyl-oxonium fluoborate, methyl tetramethylene oxonium fluoborate, ethyl tetramethylene oxonium fluoborate, dimethylpyrane oxonium fluoborate, coumarin oxonium fluoborate and camphor oxonium fluoborate.

11. A process in accordance with claim 5 wherein the said catalyst is carbonium fluoborate.

12. A process in accordance with claim 11 wherein the said carbonium fluoborate is at least one compound selected from the group consisting of trimethoxy carbonium fluoborate, triethoxy carbonium fluoborate, O-methyl butyrolactonium fluoborate, O-ethyl butyrolactonium fluoborate, O-propyl butyrolactonium fluoborate, O-methyl-N-methyl pyrrolidum fluoborate, O-ethyl-N-methyl pyrrolidum fluoborate, O-ethyl-butylol actonium fluoborate and O-ethyl-phthalidum fluoborate.

References Cited

UNITED STATES PATENTS

| | | | |
|---|---|---|---|
| 3,026,299 | 3/1962 | Kray et al. | 260—67 |
| 3,256,246 | 6/1966 | Gutweiler et al. | 260—67 |
| 3,296,210 | 1/1967 | Wilson et al. | 260—67 |
| 3,306,877 | 2/1967 | Schott et al. | 260—67 |

OTHER REFERENCES

Bodenbenner; Justus Liebig's Annalen der Chemie, vol. 623, May 1959, pp. 183 191.

Fieser and Fieser: Advanced Organic Chemistry (Rheinhold, New York), 1961, p. 135.

WILLIAM H. SHORT, *Primary Examiner.*

L. M. PHYNES, *Assistant Examiner.*